H. H. DOTY.
LAMP.
No. 7,165. Reissued June 6, 1876.
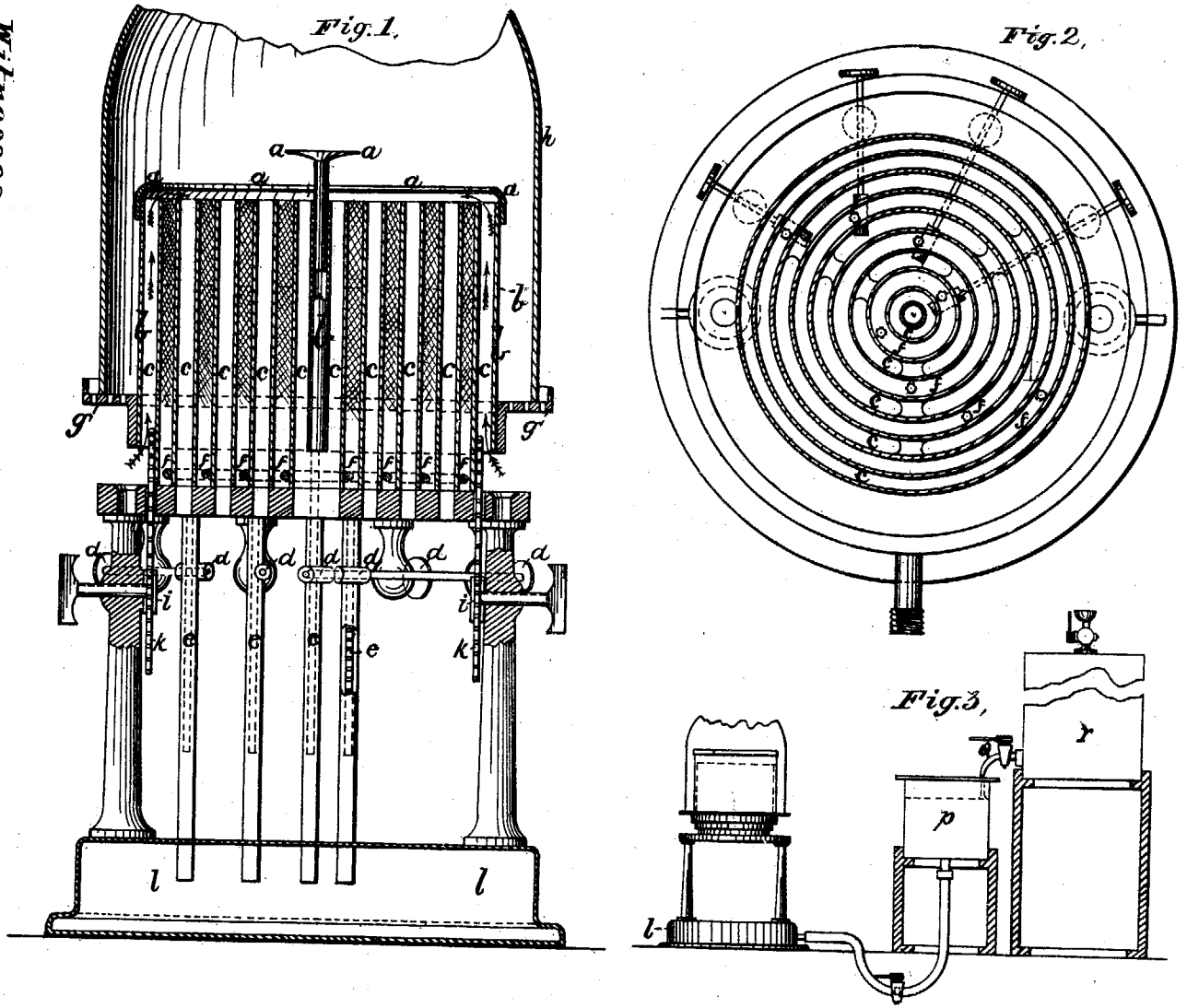
Witnesses
W. R. Eaden
John J. Walsted
Inventor.
Henry Hamin Doty
Norfolk Virginia
N. PETERS, PHOTO-LITHOGRAPHER, WASHINGTON, D. C.

UNITED STATES PATENT OFFICE.

HENRY H. DOTY, OF NORFOLK, VIRGINIA.

IMPROVEMENT IN LAMPS.

Specification forming part of Letters Patent No. 109,303, dated November 15, 1870; reissue No. 7,165, dated June 6, 1876; application filed May 29, 1876.

*To all whom it may concern:*

Be it known that I, HENRY HARRISON DOTY, of Norfolk, in the State of Virginia, have invented new and useful improvements in means and apparatus for producing the more complete combustion of paraffine and other hydrocarbon oils; and I do hereby declare that the following is a clear, full, and exact description thereof, reference being had to the accompanying drawings, and to the letters of reference marked thereon.

This invention relates to a lamp for producing the more complete combustion of paraffine and other hydrocarbon oils; and consists in combining air-conducting cylinders with the wick-holder either in single Argand or circular or in concentric circular Fresnel burners, and in an adjustable bracket or chimney-holder, located outside the external cylinder or air-jacket, constructed in such a manner as to suppress or prevent the too great a current of air from passing up next to the chimney, and thus correcting that defect in concentric burners as heretofore constructed, my improved construction serving to equalize the current of air, so that it will impinge with equal force upon all parts of the flame at and above the point of ignition, producing greater intensity, brilliancy, whiteness, and increased illuminating power from a given consumption of fluid, caused by an increased consumption of oxygen or air in proportion to the amount of oil consumed, than ever hitherto produced by any kind or size of burner, so far as I am aware. A series of tubes of different diameters, corresponding with the number of burners, is arranged vertically, one tube within the other, and uniformly brazed or soldered at the lower end to a plate or disk, in such a manner as to leave alternate air-spaces and cotton or wick spaces, the said air-spaces being continued through the plate or disk, and having a second series of movable tubes or cylinders passing through them, on the top of which are placed the flanged rings for projecting the air into the flame, the said cylinders and flanges being raised and lowered by a screw and pinion, or any other well-known means. In the concentric burners these said cylinders have ribs either on the outside or inside, or both, for dividing the air-spaces into equal parts, and the interior cylinders and flanged rings may be dispensed with when required. A bracket for carrying the chimney, also adapted to be raised and lowered by rack and pinion, encircles and may be fastened to the outer cylinder, so that both the bracket and cylinder may be raised and lowered together, if required, the said bracket having perforations for the admission of air to the outside of the flame. The burners and disk are supported on columns, or otherwise, resting on a receptacle for containing a supply of oil, the communication therefrom to the burners being through small tubes, some of which may contain the racks for raising and lowering the said burners. The receptacle above mentioned communicates with a receiver by means of a copper or other tube, having a cock at its lowest part for emptying it of its contents when required, which said tube may be carried under the lenses of a light-house, (when my invention is used for that purpose,) so that both the receiver and the air-tight reservoir, from which the receiver is supplied, may be placed outside the lenses. The said receiver is placed at a convenient height for the plentiful supply of oil to the burners, and is self-regulated by means of a cock in the air-tight reservoir, so that as soon as the oil in the receiver reaches the mouth of the cock the flow ceases, there being no pressure of the air on the top of the liquid in the reservoir, to which the oil is fed by means of a suitable cock placed thereon.

In order that my invention may be more clearly understood, I will describe the same with reference to the accompanying drawings, in which—

Figure 1 is a vertical section through the center of the lamp; Fig. 2, a plan of the lamp; and Fig. 3, a view on a reduced scale, showing the general relative arrangement of the lamp, receiver, and reservoir.

*a a* are the flanged rings for guiding or deflecting the air to the flame, the said rings being supported by the cylinders *b*, which may have ribs on one or both sides of them, for dividing the air-spaces *c* into equal parts, as shown in Fig. 1. *d* are the pinions, and *e* the racks, for raising and lowering the wick-holders *f*. *g* is the perforated bracket for carrying the chimney *h*, which is raised and lowered by the pinion *i* and rack *k*. *l* is the receptacle communicating with the receiver *p*, which is supplied by means of the cock *q* from the receiver *r*.

My construction not only permits the employment of mineral oils in light-houses—a result hitherto found impracticable and impossible by any known means, so far as I am aware—but at the same time increases the illuminating power of all oils as illuminants, and with a very material economy.

Having now described the nature and particulars of my said invention, what I claim is—

1. The combination of an outer air-jacket, with a flanged ring resting on it, and turned inward, encircling an annular wick-tube, the ring being raised above the wick-case to force the current of air passing up between it and the wick-case into the flame above the point of ignition and toward the center, and an interior tube, or its equivalent deflector, passing up through the center of the burner, to cause the uprising central current of air to be deflected upon the interior part of the flame, these inner and outer deflectors jointly forming between them a combustion-chamber.

2. In a lamp having tubular concentric wicks, with similar adjacent and proportionate air-supplying spaces, the combination of an outer or external air jacket or cylinder, a tube or deflector, located centrally in the inner air-supply space, and the vertically-adjustable chimney-bracket, with air-passage therethrough, leading to the space between the chimney and the outer cylinder, said air-supply being proportionately smaller than the supply at the side of a wick, substantially as shown and described.

HENRY HARRISON DOTY.

Witnesses:

JOHN J. HALSTED,

S. F. AUSTIN.